United States Patent
Qian et al.

(10) Patent No.: US 9,585,006 B2
(45) Date of Patent: Feb. 28, 2017

(54) EXPRESS MOBILE DEVICE ACCESS PROVISIONING METHODS, SYSTEMS, AND APPARATUS

(71) Applicant: Cellco Partnership, Basking Ridge, NJ (US)

(72) Inventors: Nanjun Qian, Princeton, NJ (US); Yuk Lun Li, Morganville, NJ (US); Manuel Enrique Caceres, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 831 days.

(21) Appl. No.: 13/927,413

(22) Filed: Jun. 26, 2013

(65) Prior Publication Data

US 2015/0004934 A1 Jan. 1, 2015

(51) Int. Cl.
| | |
|---|---|
| H04W 8/22 | (2009.01) |
| G06Q 20/32 | (2012.01) |
| H04W 12/06 | (2009.01) |
| G06Q 20/34 | (2012.01) |
| G06Q 20/40 | (2012.01) |

(52) U.S. Cl.
CPC .......... *H04W 8/22* (2013.01); *G06Q 20/3229* (2013.01); *G06Q 20/3278* (2013.01); *G06Q 20/352* (2013.01); *G06Q 20/409* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2006/0165060 A1* | 7/2006 | Dua | ........................ | G06Q 20/20 370/352 |
| 2010/0306107 A1* | 12/2010 | Nahari | ................... | G06Q 20/02 705/44 |
| 2012/0009896 A1* | 1/2012 | Bandyopadhyay | ... | G06F 1/1643 455/411 |
| 2012/0150750 A1* | 6/2012 | Law | ........................ | G06Q 20/20 705/76 |
| 2012/0239542 A1* | 9/2012 | Preston | ................... | G06Q 30/06 705/35 |
| 2012/0253974 A1* | 10/2012 | Haikonen | .............. | G06Q 20/29 705/26.41 |

(Continued)

*Primary Examiner* — Daniel Lai

(57) ABSTRACT

Methods, systems, and apparatus enable provisioning of a mobile device with access information for an account. A secure element within a subscriber identity module (SIM) or universal integrated circuit card (UICC) of the mobile device may be provisioned to enable account access. Provisioning may be performed by obtaining card data for a card associated with an account using an automated data capture device, confirming validity of the account by exchanging the card data with a user authentication server, confirming validity of the mobile device by exchanging mobile device information with a device authentication server, sending a request from the mobile device to provision the mobile device after confirming validity of the account and the mobile device, receiving provisioning instructions to provision the mobile device with the access information for the account, and provisioning the mobile device with the access information for the account based on the provisioning instructions.

20 Claims, 6 Drawing Sheets

(56) References Cited

U.S. PATENT DOCUMENTS

| | | | | |
|---|---|---|---|---|
| 2012/0254030 A1* | 10/2012 | Khan | .................. | H04L 63/0853 |
| | | | | 705/41 |
| 2013/0152185 A1* | 6/2013 | Singh | ..................... | G06F 21/35 |
| | | | | 726/9 |
| 2013/0221092 A1* | 8/2013 | Kushevsky | ........ | G06Q 20/3672 |
| | | | | 235/379 |
| 2013/0304651 A1* | 11/2013 | Smith | ................ | G06Q 20/3227 |
| | | | | 705/67 |
| 2014/0187200 A1* | 7/2014 | Reitter | ................. | H04W 4/021 |
| | | | | 455/410 |

* cited by examiner

EXPRESS MOBILE DEVICE ACCESS PROVISIONING METHODS, SYSTEMS, AND APPARATUS

BACKGROUND

Access cards, such as credit cards, debit cards, customer loyalty cards, security access cards, and building access cards are linked to accounts and enable users to access things associated with those accounts. For example, a credit card enables a user to access a line of credit from their credit card account to make purchases, a debit card enables a user to access their bank account to make purchases, a customer loyalty card enables a user to access their loyalty account to accumulate/redeem loyalty "points," a security access card enables a user to access restricted information on a computer system, and a building access card enables a user to access physical areas that are restricted without proper authorization.

Mobile device such as personal digital assistants (PDAs), tablet computers and mobile phones may be configured to store virtual versions of access cards. Typically, the addition of a new access card to a mobile device takes about 10 minutes. The process to add a new access card involves manual input of all information. The complete information is then sent to a remote processing server (e.g., a bank) for approval. This process is time-consuming and provides a poor user experience. Accordingly, there is a need for more time effective and user-friendly ways to add access card information to a mobile device.

BRIEF DESCRIPTION OF THE DRAWINGS

Examples are best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. Included in the drawings are the following figures.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
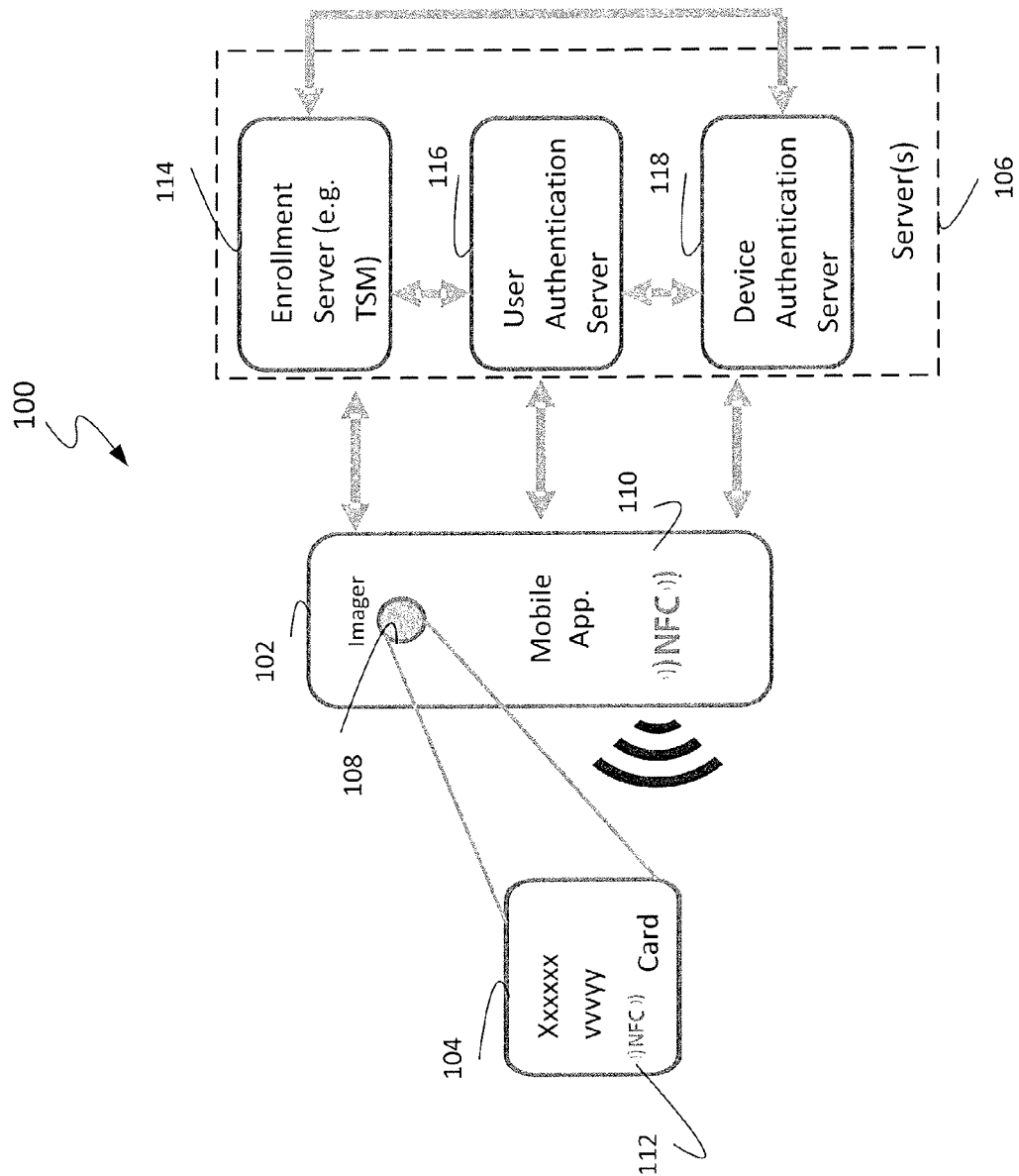
FIG. 1 is a block diagram of a system for provisioning a mobile device in accordance with teachings described herein.

FIG. 1 depicts a system 100 for provisioning a mobile device 102 with access information for an account. The system 100 includes a mobile device 102, an access card 104, and a remote system 106. The mobile device 102 may be coupled to the remote system 106 via a network such as the Internet and/or wireless networks (not shown).

The illustrated mobile device 102 includes an automated data capture device, such as an imager 108 and a near field communication (NFC) module 110, that enables card data from an access card 104 to be obtained by the mobile device 102 without the need for manual entry of text by a user. The NFC module 110 may be configured to communicate with NFC enabled access cards in a manner similar to an NFC reader terminal and/or to emulate NFC capabilities present in conventional access cards to provide information from secure storage in the device 102 to a reader terminal. It is contemplated that one or more automated data capture devices may be utilized and that other automated data capture devices may be employed in addition to, or instead of, the ones depicted in the illustrated example.

The access card 104 includes card information, including at least some information about or for an account associated with the card. The card information may be fully or partially printed on the front and/or back of the access card 104. Alternatively, or additionally, the card information may be partially or fully stored electronically on the access card 104 for access via an electromagnetic component such as a near field communication module 112.

The remote system 106 includes one or more servers. In the illustrated example, the remote system 106 includes an enrollment server 114, a user authentication server 116, and a device authentication server 118, which are described in further detail below. The enrollment server 114 may be a conventional server under the control of a bank (e.g., a Tivoli Storage Manager (TSM) available from IBM Corporation of Armonk, N.Y., USA), for example. The enrollment server 114 may provision the mobile device with access information for an account. The user authentication server 116 and the device authentication server 118 may be conventional servers under the control of a wireless communication service carrier/provider, for example. It should be apparent from the description herein that the servers may be under the control of other entities and that the functionality of the servers may be performed by fewer (e.g., one or two servers) or more servers than the examples described herein. Also, any one of the servers may be implemented on a distributed basis via an appropriate number of network connected computers or the like, e.g. to handle an expected traffic load.

In use, the mobile device 102 may capture an image of the access card 104 with the imager 108 and process the image to obtain card account data from the access card 104. In an alternative example, the mobile device 102 may capture electronic data from the card with the NFC module 110 and process the electronic data to obtain the card account data for the access card. In another alternative example, an image of access card 104 may be captured along with electronic data and the captured data may be processed and combined to obtain the account data. The card data may include an account access number and a verification number such as a card verification value (CVV).

Once the card data is obtained, the mobile device 102 may interface with the remote system 106 as described in detail below in order to provision the mobile device 102 with the necessary information to access an account associated with the access card.

Figure 2A:
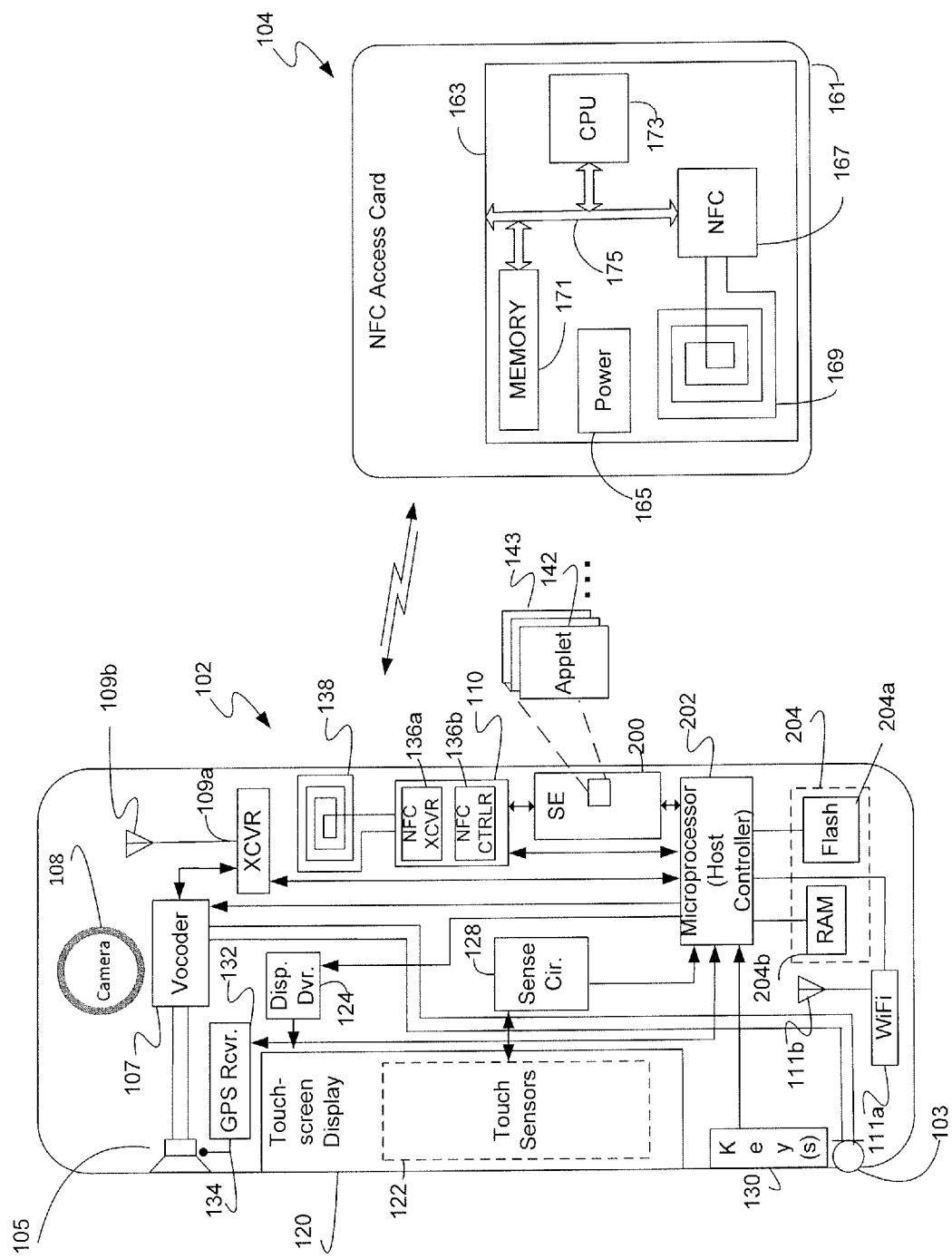
FIG. 2A is a block diagram of the mobile device and a near field communication (NFC) access card for use with the system of FIG. 1 in accordance with teachings described herein.

FIG. 2A depicts the mobile device 102 in additional detail and an NFC enabled access card 104. In addition to the imager 108 and near field communication module 110 described above, the mobile device 102 in the illustrated example includes a secure component 200, a processor 202, and a memory 204. Memory 204 may include a flash memory 204a and a random access memory (RAM) 204b. The secure component (e.g., a secure element or "SE") may be provisioned on a subscriber identity module (SIM) or universal integrated circuit card (UICC) located within the mobile device 102 or may be provisioned within the memory 204. The processor 202 is coupled to the imager 108, the near field communication module 110, the secure component 200, and the memory 204. The processor 202 performs instructions which may be stored in memory 204 in order to retrieve information from access card 104, interface with remote system 106, and provision the secure component 200 with access information for accessing an account associated with the access card 104. Additionally, the processor 202 may store data in memory 204 for later retrieval.

FIG. 2A additionally depicts a relatively short range wireless communication between the mobile device 102 and the NFC enabled access card 104. The NFC enabled access card 104 includes an NFC chipset. The NFC module 110 in the mobile device 102 communicates with the NFC enabled access card 104, for example, to receive information from the NFC enabled access card 104. In an exemplary process, the following steps may take place. At a high level, the user brings the NFC enabled mobile device 102 within proximity (e.g. 2 to 4 cm or less, although in some cases the distance may be up to 20 cm) of the NFC enabled access card 104. An application installed on the access card 104 listens for NFC events and commences a contactless data flow by establishing communication with the NFC enabled mobile device 102.

The mobile device 102, may be configured in an NFC emulation mode and in an NFC read and/or write mode.

In an emulation mode, the mobile device 102, once provisioned, may emulate an NFC access card. In a card emulation mode, the NFC enabled mobile device 104 generates a magnetic field via its antenna 138 and initiates a transaction with an NFC reader (not shown). The magnetic field carries a low-level protocol exchange to perform payment transactions similar to a payment transaction between a card and a payment terminal (not shown). The terminal is the initiator of the exchange and the mobile device 102 answers to the commands sent by the terminal. The NFC controller 136b forwards data received from the terminal to the secure component 200 for authentication. When the authentication criterion (or criteria) is met, secure information from the secure component 200 is released from the secure component 200 through the NFC controller 136b to the terminal.

In a read and/or write mode, the mobile device 102 initiates communication with an NFC enabled access card 104. In this (read and/or write) mode, the mobile device 102 is used to emulate the behavior of a contactless card reader. For example, the mobile device 102 may communicate with an NFC enabled access card 104 to access digital data. When a mobile device 102 is brought within range of the access card 104, the NFC controller 136b on the mobile device 102 detects the presence of a contactless tag of the access card 104 and generates a magnetic field, which may be used to power the contactless tag. Of course, the access card 104 may also have its own power source 165. The NFC enabled access card 104 responds with relevant content, such as an account number, a URL, etc. The exchange may be controlled by the host controller 202.

The NFC controller 136b may be configured to implement a contactless frontend (CLF) for NFC communications. The CLF, for example, provides selective routing function based on whether or not a communication involves a security function. The NFC controller 136b of the mobile device 102 may determine whether a security function is required as described in further detail below. If a security function is not required, the data message is sent to the host controller 202 for processing. However, if a security function is required, the data message from the NFC enabled access card 104 may be evaluated by a rule-set of the secure component 200. As in a peer-to-peer (P2P) case, in one example, only if authentication criterion is met by the secure component 200 does the NFC controller 136b allow the host controller 202 to process the data message provided by the NFC enabled access card 104. The authentication criterion may include geographic and/or temporal limitation. Additional details on establishing and updating a rule-set is described below.

The NFC controller 136b may determine whether a security function is required in various ways. For example, if the mode of operation is card emulation (e.g., payment), a security function is required to keep the transaction secure. Also, if the data message from the NFC enabled device 104 includes a key, a security function is required. In another example, if the payload of the data message includes a link to a Universal Resource Locator (URL), a security function is required. In another example, even if the communication may not require a security function (e.g., a simple transfer of a photo between two NFC enabled mobile devices) a user of the mobile device can request the transaction to be secure (e.g., by selecting "secure transfer" on the display of the mobile device). For example, the user of a mobile device can pre-configure their mobile device by selecting an option (e.g., on the user display) that requires information that is received and/or transferred to another mobile device to be secure. The security requirement may be with respect to all NFC communication or more focused (e.g., all mobile devices that are not on a "close friends" or "authorized" list stored in the mobile device). Thus, a mobile device that is pre-configured to receive secure NFC communication, routes the data message received from another mobile device to the secure component 200 for evaluation. If a security key is not included in the data message, then the message is deemed not secure. To assure that the data message is processed by the receiving mobile device, the NFC controller of the transmitting mobile device includes a key (provided by the SE) in the data message. To this end, the transmitting mobile device may be preconfigured to send data messages via NFC in a secure manner (i.e., with a key).

In another example, all NFC communication is routed to the secure component 200. In this example, if the data message does not include a key, it is considered not secure. Consequently, the host controller 202 is prevented from executing any instructions in the data message. In one example, the display of the mobile device indicates that the data message could not be authenticated and provides an option to override the security feature. Put differently, the user of the mobile device can override the security function and select to have the data message processed (e.g., go to an URL) even if the secure component 200 cannot authenticate the security of the data message.

The rule-set is specific to the functionality of the secure component 200 and may be different from other rule-sets used for authentication and/or security that are unrelated to NFC transactions. Additionally, there may be different rule-sets for NFC transactions that depend on where the NFC transaction originated. For example, there may be one rule-set applied to NFC data transmissions initiated by the mobile device and another rule-set applied to NFC data transmissions initiated by a point of sale device.

The rule-set(s) may include geographic and/or temporal limitations. Geographic limitations may include limitations on where a mobile device must be located to provision the mobile device in accordance with the processes described herein. For example, a mobile device may be provisioned to emulate a credit card in the country where the registered use of the mobile device resides, but may only be provisioned with security information for a building when the mobile device is determined to be in the immediate vicinity of the building. Temporal limitations may include limitations on the number of emulations that may be added to a mobile device within a specified period of time. For example, the mobile device may only be provisioned to emulate a maximum of five credit cards per 24 hour period.

The rule-set(s) are preconfigured in the secure component 200 of the mobile device 102. One or more of the rule-set(s) may be updated by a user of a mobile device 102. A user may update the rule-set(s) via an input device such as a touch screen display 120 by selecting menu options presented by the mobile device 102 on the touch screen display 120. The use may select from two or more pre-configured options (e.g., low, medium, and high security). For example, a high security rule-set option will include authentication criteria having more conditions than a medium security option.

The different NFC modes of operation may be implemented via a variety of types of mobile devices, each having a host controller 202, memory 204, and an NFC module 110 with a secure component 200, and an NFC enabled access card 104, which often will also include a processor 173, memory 171 and an RF (contactless) communication capability. It may be helpful to consider examples of a mobile device 102 and an NFC enabled access card 104 in somewhat more detail.

FIG. 2A illustrates elements of the mobile device 102 and elements of the NFC enabled access card 104 in functional block diagram form, at a relatively high level. First, we will consider the mobile device 102.

It should be appreciated that the disclosed subject matter may be implemented using essentially any mobile computing apparatus having automated data capture capabilities, such as imaging and/or NFC communication capability. Although NFC data capture examples are described in detail, suitable modification for use with imaging and other automated data capture systems will be understood from the description herein.

In the example of FIG. 2A, the mobile device 102 is in the form of a smart phone type mobile handset including a touch screen display 120. Examples of touch screen type mobile devices that may be used to implement mobile device 102 may include (but are not limited to) a smart phone, personal digital assistant (PDA), tablet computer or other portable device with NFC capability. However, the structure and operation of the touch screen type mobile device 102 is provided by way of example; and the subject technology as described herein is not intended to be limited thereto. For purposes of this discussion, FIG. 2A provides a block diagram illustration of the exemplary mobile device 102 having a touch screen display for displaying content and receiving user input as (or as part of) the user interface.

Although the transactions that are the focus of discussions here utilize data communications, a typical mobile device such as the exemplary smart phone 11, also supports voice communications. Hence, in the example shown in FIG. 2A, the mobile device 102 includes a microphone 103 for audio signal input and a speaker 105 for audio signal output. The microphone 103 and speaker 105 are communicatively coupled to a voice or audio encoder/decoder (vocoder) 107. For a voice telephone call, for example, the vocoder 107 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 2A, the mobile device 102 includes at least one digital transceiver (XCVR) 109*a*, for digital wireless communications via a wide area wireless mobile communication network, although the mobile device 102 may include additional digital or analog transceivers (not shown). The transceiver 109*a* conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 109*a* provides two-way wireless communication of information including digitized audio signals, still image and/or video signals, web page information for display as well as web related inputs, and various types of mobile message communications to/from the mobile device 102.

Several of these types of communications through the transceiver 109*a* and a network, as discussed later, relate to provisioning of the secure component 200 (e.g., secure element (SE)) by a remote system. On-line transaction-related communications involving information obtained from the NFC enabled access card 104, for example, may utilize Internet Protocol (IP) packet data transport utilizing the digital wireless transceiver (XCVR) 109*a* and over the air communications to and from base stations of the serving mobile network. Such communications may include specific account related data and security information from the mobile device 102.

In one example, the transceiver 109*a* also sends and receives a variety of signaling messages in support of various voice and data services provided by a network of a wireless service provider, to a user of mobile device 102 via the mobile communication network. Transceiver 109*a* connects through radio frequency (RF) send-and-receive amplifiers (not shown) to an antenna 109*b*. Transceiver 109*a* may also support various types of mobile messaging services, such as short message service (SMS), enhanced messaging service (EMS), and/or multimedia messaging service (MMS). Although transaction communications involving account data typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 2A, for packet data communications, the exemplary mobile device 102 may also include a WiFi transceiver 111a and associated antenna 111b. Although WiFi is used here as the example, the transceiver 111a may take the form of any available two-way wireless local area network transceiver of a type that is compatible with one or more standard protocols of communication implemented in wireless local area networks, such as one of the WiFi standards under IEEE 802.11 and/or WiMAX. The transceiver 111a, for example, may provide two-way data transport for wireless communication with a wireless access point in a residence or enterprise that the user frequents or with any available hotspot offered in a public venue. Although communicating through a different network or networks, the transceiver 111a supports various types of data communications similar to the packet data communications supported via the mobile network transceiver 109a, including communications related to data obtained from the NFC enabled access card 104 and provisioning the secure component 200 (e.g., an SE) with data obtained from a remote system.

The mobile device 102 further includes a microprocessor, sometimes referred to herein as the host controller 202, which serves as a programmable controller for mobile device 102 by configuring mobile device 102 to perform various operations, for example, in accordance with instructions or programming executable by processor 202. For example, such operations may include various general operations of the mobile device 102 as well as operations related to the communication with the NFC enabled access card 104 and conducting related transactions as described herein. A flash memory 204a is used to store, for example, programming or instructions for execution by the processor 202. Depending on the type of device, the mobile device 102 stores and runs an operating system through which specific applications may be run on the device. Examples of operating systems include Android, Apple iOS (I-Phone or iPad devices), Windows Mobile, RIM BlackBerry operating system, or the like. Flash memory 204a may also be used to store mobile configuration settings for different mobile applications or services executable at mobile device 102 (using processor 202). Mobile device 102 may also include a non-volatile random access memory (RAM) 204b for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled access card 104 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related transaction communications of the type under consideration here, may include a variety of different types of user interface elements. For discussion purposes, in the smart phone example shown in FIG. 2A, the user interface elements of mobile device 102 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Touch sensors 122 may be configured as a biometric sensor that captures a biometric signature, e.g., a finger print. Other interface elements may include an imager 108 and a keypad including one or more keys 130. Imager 108 may also be configured as a biometric sensor that captures a biometric signature, e.g., an image of a retina. The keypad may be implemented in hardware as a T9 or QWERTY keyboard of mobile device 102 and keys 130 may correspond to the physical keys of such a keyboard. Alternatively, keys 130 (and keyboard) of mobile device 102 may be implemented as "soft keys" of a virtual keyboard graphically represented in an appropriate arrangement via touch screen display 120. The soft keys presented on the touch screen display 120 may allow the user of mobile device 102 to invoke the same user interface functions as with the physical hardware keys. In some implementations, the microphone 103 and speaker 105 may be used as additional user interface elements, for audio input and output, including with respect to some functions related to the transaction processing and communication, as described herein.

For output, touch screen display 120 is used to present visible information (e.g., text, video, graphics or other visible content) to the user of mobile device 102. Host controller 202 controls visible display output on the LCD or other display element of the touch screen display 120 via a display driver 124, to present the various visible outputs to the device user. For example, some of the transaction-related programming may cause the processor 202 to operate the driver 124 to cause screen 120 to display visible multimedia information corresponding to steps performed by the mobile device 102 to provision the mobile device with account access information as described herein.

In general, touch screen display 120 and touch sensors 122 (and one or more keys 130, if included) are used to provide the textual and graphical user interface for the mobile device 102. In an example, touch screen display 120 provides viewable content to the user at mobile device 102. Touch screen display 120 also enables the user to interact directly with the viewable content provided in the content display area, typically by touching the surface of the screen with a finger or an implement such as a stylus.

As shown in FIG. 2A, the mobile device 102 also includes a sense circuit 128 coupled to touch sensors 122 for detecting the occurrence and relative location/position of each touch with respect to a content display area of touch screen display 120. In this example, sense circuit 128 is configured to provide processor 202 with touch-position information based on user input received via touch sensors 122. In some implementations, processor 202 is configured to correlate the touch position information to specific content being displayed within the content display area on touch screen display 120. The touch-position information captured by sense circuit 128 and provided to processor 202 may include, but is not limited to, coordinates identifying the location of each detected touch with respect to the display area of touch screen display 120 and a timestamp corresponding to each detected touch position.

The user interface capabilities of the mobile device 102 provide output to and receive input from the user of the mobile device 102, for any of the various functions, operations or applications of the device. For example, programming (discussed more later) that configures the mobile device 102 to obtain and act on data from the NFC enabled access card 104 may include further acknowledgment requests from the user. For example, the mobile device 102 may present information read from the NFC enabled access card 104 on the display 120 during a transaction on the account and prompt the user whether they would like to continue with provisioning the mobile device with access information.

Many implementations of mobile devices today support location based services. Location information may be used in a variety of services/applications. Some uses or transactions involving account information obtained from the NFC enabled access card 104 may also involve location determination. For example, the location information of the mobile device 102 may be part of the information provided to a remote server (e.g., enrollment server discussed later) to determine the authenticity of the transaction. By way of just one example, the current location of the mobile device 102 may be recorded in memory of the device and/or communicated to a server or other equipment involved in a transaction, when the mobile device communicates over a network (e.g. to conduct a transaction). If the mobile device is in a restricted area (e.g., in a foreign country) transactions may be prohibited.

There are a variety of ways that a mobile device 102 may be configured to obtain information as to current location of the device. In one example, the mobile device 102 includes a global positioning satellite (GPS) receiver 132 and associated antenna 134. GPS is a space-based satellite navigation system that provides location and time information anywhere on Earth, where there is an unobstructed line of sight to at least three, or more of the GPS satellites.

As described above, the illustrated mobile device 102 has NFC communication capability. NFC may be used for a variety of different functions or applications of the mobile device 102. In one example, the mobile device 102 interacts with the NFC enabled access card 104 via the NFC communication capability of the mobile device 102 and, once provisioned as described herein, may emulate the NFC enabled access card to access an account associated with the access card via an NFC enabled reader. NFC is a set of standards for smart phones and similar devices, such as the exemplary mobile device 102 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device includes a transceiver configured to communicate with other NFC capable equipment.

The illustrated mobile device 102 further includes an NFC sensor. The NFC sensor may be implemented in a variety of ways. In the exemplary mobile device 102 of FIG. 2A, the NFC sensor includes an NFC type radio frequency transceiver 136a, which is formed by an NFC chipset 110. The NFC chipset 110 provides two-way wireless communication of information in accordance with NFC technology and protocols. The NFC chipset 110 includes an NFC controller 136b. For simplicity, the NFC 110 is sometimes referred to herein as the NFC controller or module 110, while it will be understood that it is a controller within the NFC chipset 136. The exemplary NFC sensor also includes an antenna, such as coil antenna 138. The NFC chipset 110 of apparatus 102 connects to the NFC coil antenna 138, for transmitting and receiving NFC communications to/from other NFC compatible devices with compatible transceivers over short air link distances. The transceiver 136a formed by the NFC chipset 110 also sends and receives a variety of signaling messages for establishing NFC links with other NFC-enabled devices and sends and receives various user data over the established NFC links. The signaling, for example, may allow the transceiver formed by the NFC chipset 110 to detect proximity of another NFC capable device, establish an NFC link with the other device, trigger execution of an appropriate application within the mobile device 102 and send and/or receive data for the application as between the mobile device 102 and the other NFC capable device. Some modern mobile devices are already equipped with such NFC equipment, and increased NFC deployment is expected in the future.

In order to run secure applications such as payment, access to buildings, and the like, there is a secure component 200 (e.g., a secure element (SE)). In one example, the secure component is a separate chip that includes tamperproof storage and execution memory and is configured to communicate with an NFC controller 136b (a secure processor). The NFC controller 136b is different from the host controller 202 in that it focuses on enabling secure transactions. The secure component contains applications (e.g., applets) that use secure keys running inside the secure processor. For example, there may be at least one applet 142 for processing of a payment transaction; and at least one applet 143 for processing of at least one type of communication not related to a payment transaction, such as a read/write or P2P operation.

The applications that run on the secure component may run on a Javacard operating system. The secure component may include various account information, such as account number, user identification, a personal identification number (PIN), or the like for user verification and possibly account balance and/or transaction record information. The secure component may be used to decode credentials of NFC enabled devices. In various examples, the secure element may be part of a subscriber identification module (SIM), universal integrated circuit card (UICC), or a separate secure element like a secure digital (SD) memory card used for storing and accessing applications and data in a secure manner.

Although cryptographic elements are not separately shown, the NFC chip 110 may be configured such that NFC transmissions can be encrypted. In one example, communications between the secure component and the enrollment server may be encrypted. Accordingly, the secure data storage and encrypted communication provide enhanced security and reduce the likelihood of fraud against a user's financial account.

In one example, the NFC controller 110 is configured to route all NFC traffic (e.g., data message from or sent to an NFC enabled device) through a secure component 200. Thus, the NFC controller 110 may route NFC communication between the NFC system and the secure component 200 without going to or from the host controller 202.

It will be understood that not all applications require the use of a security function. For example, two mobile device users may want to exchange business cards. To this end, the NFC controller 110 may have the ability to send the information directly to the host controller 202 for further execution (without the security function of the secure component 200). Accordingly, in one example, the NFC controller 110 is configured to determine whether a security function is required. If so, the NFC controller 110 routes the near field communication between the NFC system and the secure component 200 without going to or from the host controller 202. However, upon determining that a security function is not required, the NFC communication may be routed between the NFC system and the host controller 202 without going to or from the secure component 200.

The NFC controller 110 may determine whether a security function is required in various ways. For example, if the mode of operation is card emulation (e.g., payment), a security function may be used to keep the transaction secure. Also, if data from the NFC enabled access card 104 includes a key, a security function may also be used. In another example, even if the communication may not require a security function (e.g., a simple transfer of a photo between two NFC enabled mobile devices) the user of the transferor or transferee (i.e., writing or reading) mobile device may request the transaction to be secure. For example, the user of a mobile device can pre-configure their mobile device by selecting an option (e.g., on the user display) that requires information that is received and/or transferred to another mobile device to be secure. The security requirement may be with respect to all NFC communication or more focused (e.g., all mobile devices that are not on a "close friends" or "authorized" list stored in the mobile device). Thus, a mobile device that is pre-configured to receive secure NFC communication, routes the data message received to the secure component for evaluation. If a security key is not included in the data message, then the message may be deemed not secure. To assure that the data message is processed by the transferee mobile device, the NFC controller of the transferor mobile device may include a key (provided by the secure component) in the data message. To this end, the transferor mobile device may be preconfigured to send data messages via NFC in a secure manner (i.e., with a key).

In another example, all NFC communication is routed to the secure component. Consequently, the host controller is prevented from executing any instructions in the data message. In one example, the display of the mobile device indicates that the data message could not be authenticated and provides an option to override the security feature. Thus, the user of the mobile device may be able to override the security function and select to have the data processed even if the secure component cannot authenticate the security of the data message.

The logic implemented by the host controller 202 of the mobile device 102 configures the processor 202 to control various functions as implemented by the mobile device 102. The logic for a processor may be implemented in a variety of ways, e.g., through programming for execution by the microprocessor 202. Similarly, logic implemented by the NFC controller 136b configures the controller 110 to control various functions related to NFC communication. For example, one or more application programs are stored in the secure component 200 for execution by the NFC controller 136b. Any application that is intended to utilize account related information obtained from the NFC enabled access card 104 may include information stored in the secure component 200. For example, information in connection with a transaction with an NFC enabled access card 104 is stored in the secure component 200, which when executed by the microprocessor 202 enables the mobile device 102 to perform transactions (e.g., make a purchase, make an ATM withdrawal, unlock a door, etc.) using the NFC sensor formed by the NFC chipset 110 and the associated antenna 138. As disclosed above, transactions that meet predetermined criteria (i.e., requiring a security function) are first routed through the secure component 200.

The structure and operation of the mobile device 102, as outlined above, were described by way of example only.

The NFC enabled access card 104 in our example includes a power supply module 165, an NFC transceiver 167 and associated coil antenna 169, and one or more memories 171. The NFC enabled access card 104 may or may not include a processor serving as the central processing unit (CPU) 173 of the chip 163 and a bus system 175. For example, a CPU may not be included if the NFC enabled access card 104 is used as a tag but otherwise is included if used in a P2P transaction or a smartcard transaction. The NFC enabled access card 104 may or may not include a battery or other internal power source. For example, instead of a power source, the power module 165 may collect energy at the time of a communication from the RF transmissions from the mobile device 102 via inductive coupling. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The exemplary NFC transceiver 167 connects to the coil antenna 169, for transmitting and receiving RF communications to/from the NFC enabled mobile device 102. Hence, the chipset 136 and NFC transceiver 167 are sufficiently compatible to enable the mobile device 102 to detect and communicate with an NFC enabled access card 104. In one example, from the perspective of the card, the NFC enabled mobile device 102 can appear as a reader NFC enabled device. Thus, the NFC enabled access card 104 may act as a tag and the mobile device 102 may act as a reader when in read/write mode of operation.

The memory 171 of the NFC enabled access card 104 stores data and/or executable programming for the CPU 173. In one example, the memory 171 may include a key that is used for security purposes by the secure component 200 of the mobile device 102. For example, this key may be provided by an enrollment server during a prior provisioning process. Thus, the payload provided by the NFC enabled access card 104 to the mobile device 102 may include digital payload (e.g., account number) and a key (provided by the enrollment server). The NFC controller 136b of the mobile device, upon determining that a security feature is required, sends the payload to the secure component 200 for authentication. Upon authentication, the NFC controller may route the payload (e.g., without the key) to the host controller 202 for processing.

The bus 175 supports signaling and transfer of data and/or instructions as between various elements on the chip 163 including the CPU 173, the memory 171 and the NFC transceiver 167. The memory 171 and programming execution by the CPU 173 provide data storage.

The structure and operation of the NFC enabled access card 104, as outlined above, were described by way of example, only.

Figure 2B:
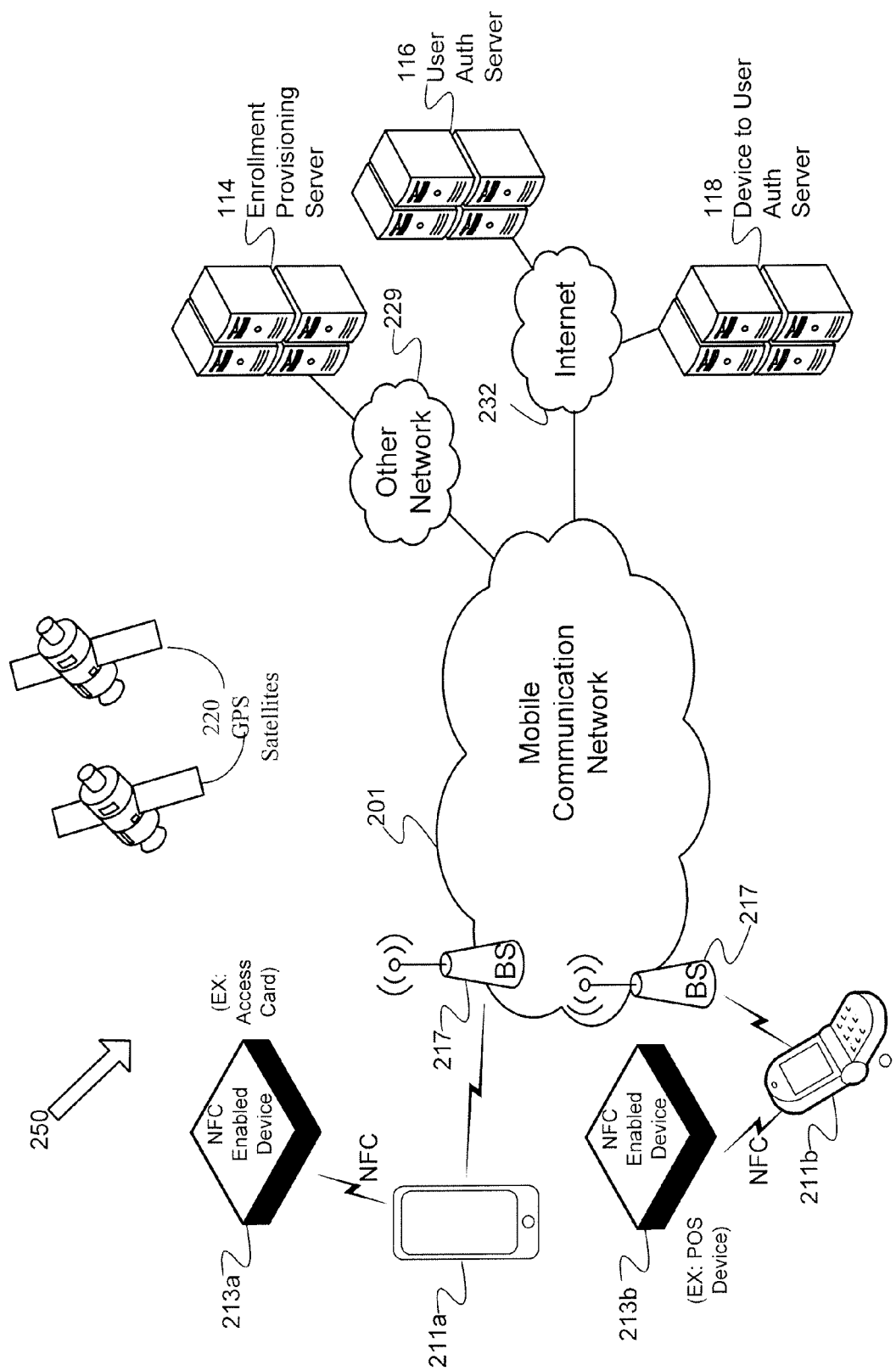
FIG. 2B is a block diagram of a mobile communication system in which teachings described herein may be employed.

FIG. 2B illustrates a system 250 offering a framework to provide NFC communication between a mobile device (e.g., 211a, 211b) and an NFC enabled device (e.g., 213a, 213b) and for provisioning of a mobile device for secure NFC communication with another device. The example of FIG. 2B shows several mobile device 211a, 211b (collectively referred to as mobile device) that are examples of devices that may be used for communicating with NFC enabled devices 213a, 213b (i.e., through NFC communication) when a mobile device is in close proximity to a respective NFC enabled device. For purposes of provisioning of a secure component (e.g., security element (SE)) on the mobile device, each mobile device may have access to the mobile communication network 201. Each NFC enabled apparatus/device 211a, 211b, 213a, 213b provides two-way wireless communication of information in accordance with NFC technology and protocols.

As described herein, NFC enabled device 213a is a device such as an access card that a user would like to emulate with their mobile device 102. Mobile device 211a is used to describe operation of a mobile device 102 prior to being provisioned to emulate a particular NFC enabled access card. Mobile device 211a is configured to act as a card reader in interactions with NFC enabled device 213a in order to obtain card data from the NFC enabled device 213a for use in the provisioning processes described herein. As described in detail below with reference to FIGS. 3 and 4, the mobile device 211a exchanges information received from the NFC enabled device 213a with a remote system to ultimately provision a secure component (e.g., an SE) within the mobile device such that the mobile device 211a is provisioned with access information for an account associated with the NFC enabled device 213a. Once provisioned, the mobile device may emulate the NFC enabled access card.

Mobile device 211b is used to describe operation of a mobile device 102 after it has been provisioned to emulate an NFC enabled access card as described herein. The mobile device 211b may interface with an NFC enabled device 213b such as a point of sale (POS) device as if the mobile device 211b were an access card such as NFC enabled device 213a.

In the example of FIG. 2B, the mobile communication network 201 provides communications for mobile device 211a and 211b as well as for mobile devices/users that do not participate in NFC-based services (e.g., regular mobile devices such as cell phones, tablet computers, etc., that do not include NFC chip sets or devices that have such chip sets but whose users do not participate in any NFC-based service). Thus, network 201 may provide regular voice and data cellular services. The network 201 provides wireless communications services to the mobile device shown and other mobile device (not shown), via a number of base stations (BSs) 217. The present techniques may be implemented in any of a variety of available mobile networks 201 and/or on any type of mobile device compatible with such a network 201, and the drawing shows only a very simplified example of a few relevant elements of the network 201 for purposes of discussion here.

The mobile communication network 201 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the mobile device 211a and 211b are capable of voice telephone communications through the network 201, and for receiving provisioning information from the enrollment server 114. The mobile device 211a, 211b are capable of data communications through the particular type of network 201, and the users thereof typically will have subscribed to data service through the network.

The network 201 allows users of the mobile device such as 211a, 211b (and other mobile device to send information to a remote system 106 (FIG. 1) and receive security information, (e.g., security keys), from an enrollment server 114.

The mobile communication network 201 can be implemented by a number of interconnected networks. Hence, the overall network 201 may include a number of radio access networks (RANs), as well as regional ground networks interconnecting a number of RANs and a wide area network (WAN) interconnecting the regional ground networks to core network elements. A regional portion of the network 201, such as that serving mobile device 211a, 211b, can include one or more RANs and a regional circuit and/or packet switched network and associated signaling network facilities.

Physical elements of a RAN operated by one of the mobile service providers or carriers include a number of base stations represented in the example by the base stations (BSs) 217. Although not separately shown, such a base station 217 can include a base transceiver system (BTS), which can communicate via an antennae system at the site of base station 217 and over the airlink with one or more of the mobile devices, when the mobile device 211a, 211b are within range. Each base station 217 can include a BTS coupled to several antennae mounted on a radio tower within a coverage area often referred to as a "cell." The BTS is the part of the radio network that sends and receives RF signals to/from the mobile device 211a, 211b that are served by the base station 217. The network can also include other elements that support functionality other than device-to-device media transfer services such as messaging service messages and voice communications. Specific elements of the mobile communication network 201 for carrying the voice and data traffic, and for controlling various aspects of the calls or sessions through the network 201, are omitted here for simplicity. It will be understood that the various network elements can communicate with each other, as well as other aspects of the mobile communication network 201, and other networks (e.g., the public switched telephone network (PSTN) and the Internet 223) either directly or indirectly.

The carrier providing communication and other services through the network 201 may also operate a number of systems that provide ancillary functions in support of the communications services and/or application services provided through the mobile communication network 201; and those elements communicate with other nodes or elements of the mobile communication network 201, such as one or more private IP type packet data networks 229 (sometimes referred to as an Intranet), i.e., a private network. Generally, such ancillary systems are part of or connected for communication via the private network 229 of the establishment discussed herein. It will be understood that systems outside of the private network could serve the same functions as well. Examples of such systems, in this case operated by the network service provider as part of the overall system 250, which communicate through the intranet type network 229, include one or more servers.

Enrollment server 114 is configured to provide various functions, including the function of determining whether information received by a mobile device from an NFC enabled device (e.g., 213a, 213b) is secure. In one example, the enrollment server 114 provisions (e.g., provides keys, access codes, security parameters, etc., to) the secure component of the NFC system of the mobile device 211a via the mobile communication network 201. In various examples, the communication between the enrollment server 114 and the mobile device (e.g., 211a) is initiated by the enrollment server 114 (e.g., for regular security and/or user preferences updates) or upon a request from the mobile device 211a.

In one example, the enrollment server 114 may provide provisioning information to an application installed on the mobile device (e.g., 211a). The provisioning information received by the application on the mobile device 211a may include security parameters, access codes, and the like. For example, the application may program the security element of the mobile device 211a to update the security information and/or provide access authorization information to the mobile device 211a. The enrollment server 114 may attempt to provide provisioning to all NFC capable mobile devices or only to mobile devices that meet certain criteria. Criteria for provisioning may include pre-registration with the enrollment server 114 for emulation of one or more types of cards (e.g., credit, security, etc.). Alternatively, or additionally, the enrollment server 114 may communicate with the user authentication server 116 and/or the device authentication server 118 to obtain identification information about the user/subscriber and/or the mobile device to see if the obtained information matches information associated with the NFC enabled device to be emulated. The criteria is satisfied if a match occurs (complete or within a predefined threshold). Once a mobile device has successfully met the criteria associated with a particular card type (e.g., a credit card), the mobile device may be provided with a key/applet (that is stored in the secure component) to facilitate provisioning of the mobile device with information for other cards of that type (e.g., without the requirement to access the enrollment server 114).

The security information may include keys that are used to unlock the payload received from an NFC enabled device 213a by the mobile device 211a. For example, when a mobile device 211a comes into close proximity (e.g., 2 to 4 cm or less) to an NFC enabled device 213a to receive information therefrom, the NFC controller of the mobile device 211a may determine that a security check should be performed as described above, e.g., based on transaction type, user configurations and/or an URL in the payload received from the NFC enabled device 213a. The secure component of the mobile device 211a informs the NFC controller whether the information obtained from the NFC enabled device 213a is secure. For example, the secure element has been pre-programmed by the application of the mobile device based on prior provisioning information (e.g., keys) received from the enrollment server 114. In one example, if the secure element of the mobile device has not been pre-programmed, the NFC controller (via the program) sends the payload obtained from the NFC enabled device 213a to the enrollment server 114 to receive provisioning information from the server. The secure element is then programmed by the application based on the information provided by the enrollment server 114. Thus, the secure element can be both pre-programmed (before a communication with an NFC enabled device 213a) or programmed after receiving a payload from the NFC enabled device 213a. The secure element can then determine whether the information obtained from the NFC enabled device 213a via an NFC communication is secure to be executed by the host controller of the contactless front end of the mobile device 211a.

The enrollment server 114 may also include or have access to a user authentication server 116 that includes information about a user and a device authentication server 118 that includes information about the mobile device and a registered user of the mobile device. For example, user authentication server 116 may include account information and basic key facts about the user, such as: age, address, etc. and the device authentication server 118 may include a mobile device identification number associated with the user.

While in the example of FIG. 2B the enrollment server 114, the user authentication server 116, and the device authentication server 118 have been illustrated as separate servers, the functionality described herein with respect to each of the servers 114, 116, and 118 can also be provided by one or multiple different computing devices. In other words, the enrollment server 114, user authentication server 116, and device authentication server 118 need not be stand-alone computing devices but can be combined in various configurations with each other and/or with other server functions.

In one example, the system 250 includes a plurality of satellites 220 to provide location information to a mobile device (e.g., 211b) and/or an NFC enabled device (e.g., 213b) where there is an unobstructed line of sight between the satellites 220 and the receivers. For example, the mobile device 211b may use its GPS receiver to determine the location information of an NFC enabled device 213b that is within range of NFC communication. For an additional level of security, the location information may be appended to the data message received from the NFC enabled device 213b and then sent to the secure component of the mobile device 211b. In this example, the secure component would include the location information in determining whether to allow the host controller to execute the information in the payload. For example, the data message is logged in a memory of the secure component. The secure component also has stored in its memory location information for respective NFC enabled devices. The location information and keys may be provided by the enrollment server 114. Accordingly, if the device is not within a predetermined radius of the stored location information, the message provided by the device is prevented from being executed by the host controller of the mobile device 211b. In one example, a warning is displayed on the user interface of the mobile device indicating that the NFC enabled device is not where it should be. In one example, the user can choose to accept the risk and process the data message.

The structure and operation of system 250, as outlined above, were described by way of example only.

Figure 3:
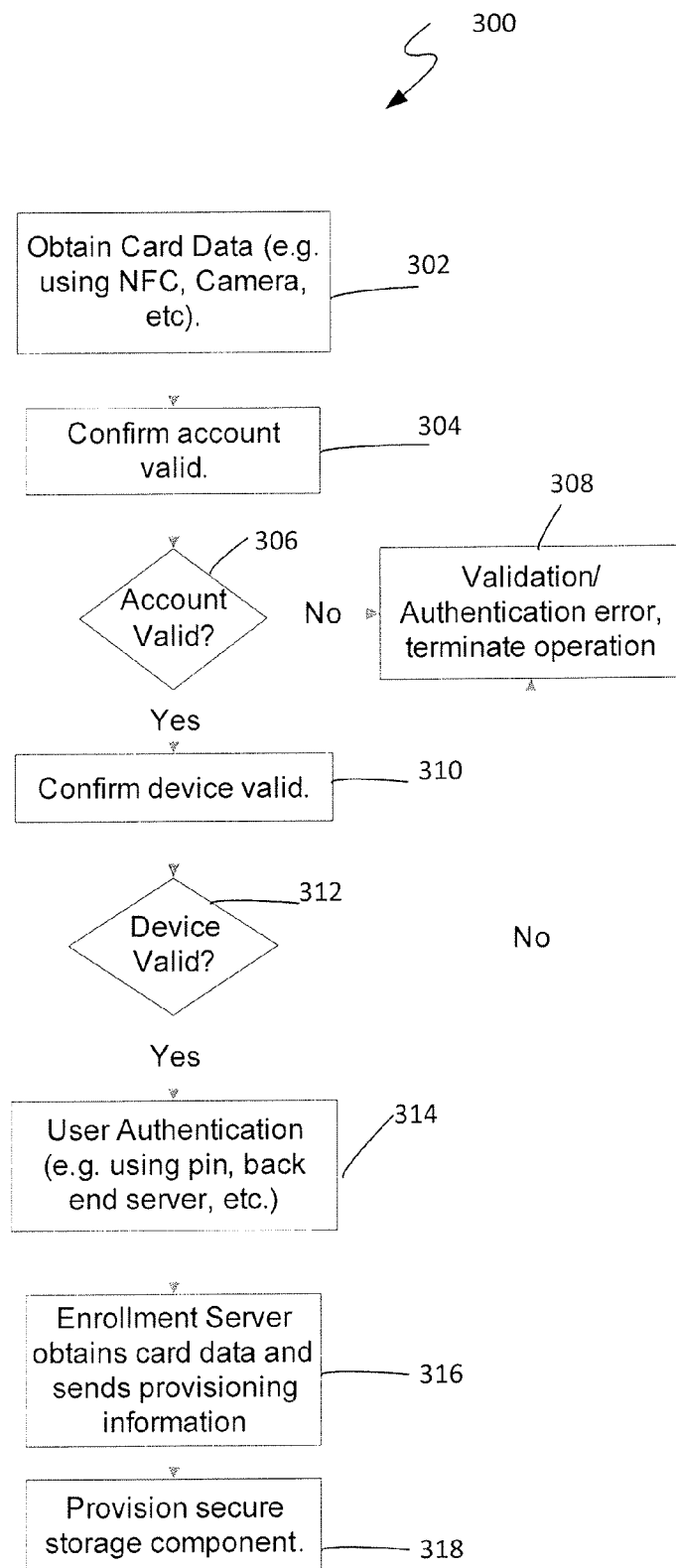
FIG. 3 is a flowchart of steps for provisioning the secure element of a mobile device in accordance with teachings described herein.
Figure 4:
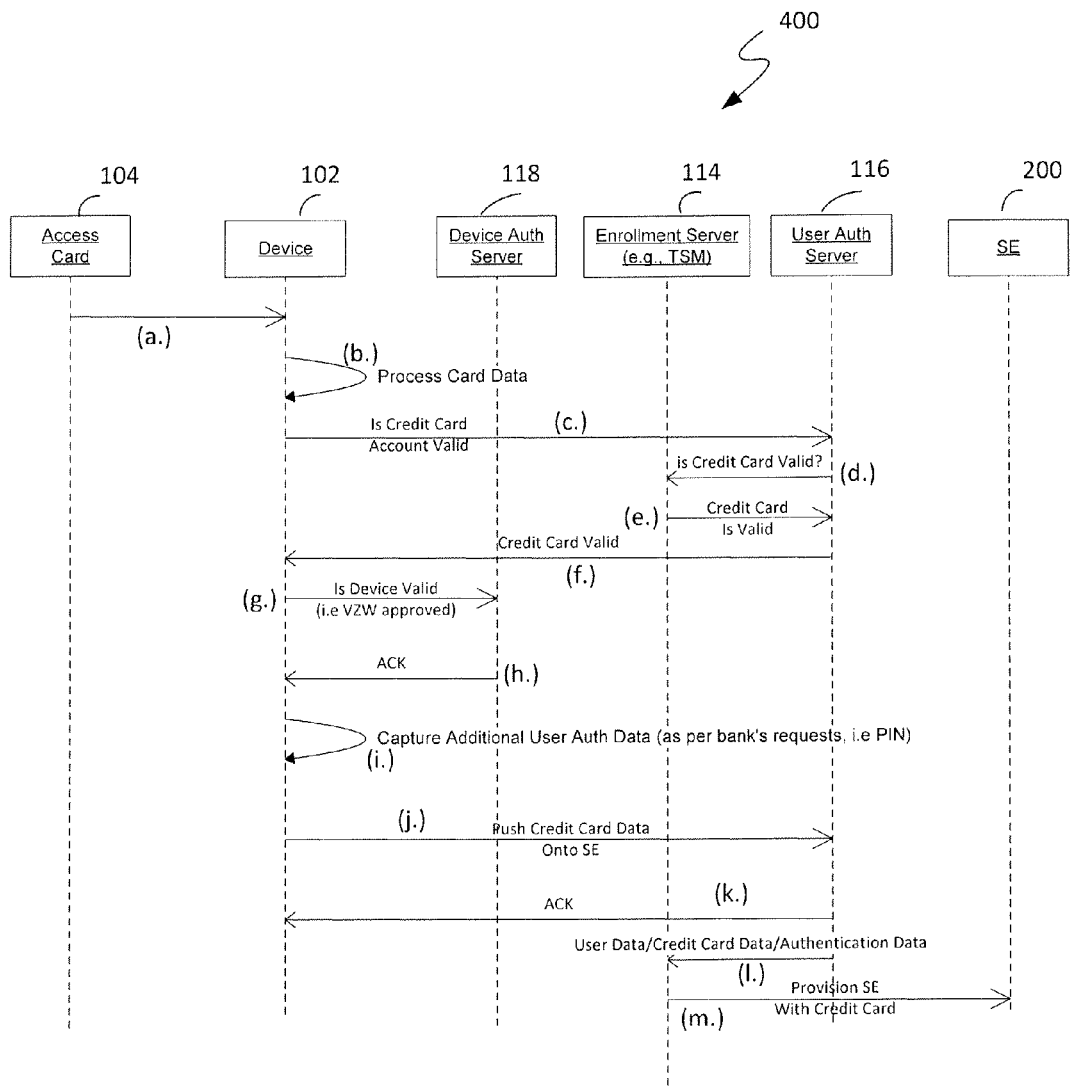
FIG. 4 is a process flow chart depicting the processing flow of data for provisioning the secure element of a mobile device in accordance with teachings described herein.

FIG. 3 depicts a flow chart 300 of exemplary steps for provisioning a secure component of a mobile device with access information for accessing an account linked to an access card, and FIG. 4 depicts a corresponding process flow 400 showing communications between various elements involved in the provisioning process. The steps for provisioning the secure element are described with reference to the access card 104, mobile device 102, and remote system 106 described above with reference to FIGS. 1 and 2a. It will be understood that other cards, apparatus, and systems may be employed to implement the steps described below.

At step 302, card data is obtained for an access card associated with an account (e.g., a credit card account). The card data is obtained using an automated capture device. Obtaining of the card data is depicted in the process flow 400 at indicator (a.). The card data may be obtained by a mobile device 102 using an automated capture device such as an imager 108 and/or a near field communication module 110.

In examples using an NFC module 110 as the automated capture device, the NFC module 108 is used to capture card data from an NFC enabled access card 104 via an NFC exchange. For example, if the access card is a credit card with card data stored in a memory 171 such as a name, credit card number, verification number, and/or security key, the NFC module 110 may interact with an NFC controller 167 in the access card 104 to capture that information. Processor 202 within mobile device 102 may then process the captured information to obtain the card data (e.g., the name, credit card number, verification number and/or security key).

In examples using an imager 108 as the automated capture device, the imager 108 is used to capture an image(s) of the front and/or back of the access card 104. For example, if the access card is a credit card with card data printed on it such as a name and credit card number on one side and a verification number on another side, the imager 108 may capture an image of the front and/or the back of the card. Processor 202 within mobile device 102 may then process the image(s), e.g., using optical character recognition (OCR) algorithms, to obtain the card data (e.g., the name, credit card number, and/or verification number).

In order to mitigate against malicious enrollment, each access card may have a unique front, e.g., by employing steganography. The card may be embedded with an encrypted message or pattern on the front of the access card. When applying steganography to the artwork of the card, the steganographic pattern would be kept secret. Also, or alternatively, an encryption algorithm could be employed to ensure that the card is authentic. Additionally, the captured image of the card may be stored for use with a credit card management system, e.g., so that the user can visually identify which card they want to use without looking at account number.

The mobile device 102 may additionally process the card to determine if the card data is in the correct format, e.g., has the appropriate number of digits. If the format is incorrect, the mobile device 102 may halt the process of provisioning the mobile device 102 with access information and provide an indicator to the user such as a text message displayed on a display 120 to indicate that an error has occurred, as well as perhaps the type of error and steps to correct the error. Additional processing by the mobile device 102 is depicted in the process flow 400 at indicator (b.).

At step 304, the validity of the account associated with the access card is confirmed. The validity of the account may be confirmed by determining that the account is open and in good standing in response to obtaining the card data. The validity of the account may be confirmed by exchanging at least a portion of the card data with the remote system 106. In an example, account validity is determined by sending an inquiry from the mobile device 102 to the user authentication server 116 (depicted in the process flow 400 at indicator (c.)), sending an inquiry from the user authentication server 116 to the enrollment server 114 in response to receiving the inquiry from the mobile device (depicted in the process flow 400 at indicator (d.)), receiving an indication from the enrollment server 114 at the user authentication server 116 of whether the account is valid in response to receiving the inquiry from the user authentication server 116 (depicted in the process flow 400 at indicator (e.)), and providing the indication of validity from the user authentication server 116 to the mobile device 102 (depicted in the process flow 400 at indicator (f.)).

At step 306, a determination is made regarding the validity of the account. If the account is valid (e.g., based on the indication of validity from the user authentication server 116) processing proceeds at block 310. If the account is determined not to be valid processing proceeds at block 308 with the termination of the provisioning. An indicator may be provided to the user such as a text message displayed on a display 120 of the mobile device 102 if the provisioning is terminated. In one example, the message may be stored in the mobile device for display by the display 120 upon an indication of invalidity from the user authentication server 116. In another example, the user authentication server 116 or another remote server may send a message that the account is invalid via a messaging system (which may encompass other devices and/or servers; not shown) to be displayed on the display 120. In other examples, other messaging systems may provide an indication of account invalidity, e.g., a popup presented on the display 120.

At step 310 the mobile device being provisioned is validated. The validity of the mobile device may be obtained by exchanging mobile device information unique to the mobile device 102 with the remote system 106. The validity of the mobile device may be determined by the device authentication server 118. The device authentication server may store data about the user and/or the mobile device such as the mobile device identifier on the network and the name, account number, and address of the account holder.

In an example, validity of the mobile device 102 is determined by sending an inquiry from the mobile device 102 to the device authentication server 118 including mobile device information such as the mobile device identifier on the network (depicted in the process flow 400 at indicator (g.)) and receiving an acknowledgement from the device authentication server 118 of whether the mobile device 102 is a valid device based on, for example, a comparison of the received mobile device information to information stored by the device authentication server 118 (depicted in the process flow 400 at indicator (h.)).

At step 312, a determination is made regarding the validity of the mobile device. If the mobile device is valid (e.g., based on an indication of validity in the acknowledgement from the device authentication server 118 to the mobile device 102) processing proceeds at block 314. If the mobile device is determined not to be a valid device, processing proceeds at block 308 with the termination of provisioning operation. An indicator may be provided to the user such as a text message displayed on a display 120 if the provisioning is terminated. In one example, the message may be stored in the mobile device for display by the display 120 upon an indication of invalidity from the device authentication server 118. In another example, the device authentication server 118 or another remote server may send a message that the device is invalid via a messaging system (which may encompass other devices and/or servers; not shown) to be displayed on the display 120. In other examples, other messaging systems may provide an indication of account invalidity, e.g., a popup presented on the display 120.

In one example, validity of the mobile device may be further based on compliance with geographic and/or temporal limitations. The mobile device may store the geographic and/or temporal limitations in a secure component 200. One or more of the limitations may reside in the server(s) 106 also or instead of. The mobile device may compare information determined by the mobile device and/or received from the server(s) 106 with the stored limitations. For example, the current location of the mobile device (e.g., as determined based on GPS information) may be compared to address information for a registered user in the device authentication server 118 to determine compliance with a geographic limitation (e.g., the country in which the mobile device is currently being operated corresponds to the country associated with the received address information for the registered user. In another example, the mobile device may compare the number of provisioning emulations it performed within the last 24 hours to determine whether it complies with a temporal limitation (e.g., less than 5 emulations provisioned within the last 24 hours).

At step 314, user authentication information may be obtained. The user authentication information may be information required by a backend system such as the enrollment server 114 (e.g., a personal identification number and/or other means for authenticating a user such as a biometric signature). For example, the mobile device 102 may require that the user input a personal identification number or provide a biometric input, e.g., place their finger on the touch sensor 122 to obtain a fingerprint and/or look into the imager 108 to capture an image of their retina. The obtaining of user authentication information by the mobile device 102 is depicted in the process flow 400 at indicator (i.). Also, a user can take a picture of a driver's license or other "secure" credential. OCR can then be employed to extract relevant fields (e.g., name, social security number or other document number identifier, and date of birth) and appropriate data fields can be populated for communication to the enrollment server 114, for example.

The steps 310 to 312 are performed to ensure that the mobile device 102 to transfer the card account access information onto is authenticated as a device belonging to the owner of the access card. Step 314 is performed to gather additional information that may be required by the enrollment server for authentication of the user. The following non-limiting examples illustrate how this authentication can be achieved. Others will be apparent and are considered within the scope of the present discussion. One example is to have the user input a personal identification number (PIN), such as the PIN they use for bank web access or an automated teller machines (ATM) PIN or a PIN from the security department of the company the user works for, etc. The PIN may sent along with access card information to an institution for authentication (such as a bank, company security, etc). In another example, there can be a database(s) that is maintained by one or more of a carrier, service provider (ISIS), bank, security department, etc. that associates the user with a secure ID number associate with the device. The owner or authorized user of the access card may then be validated against the owner of the device. In yet another example, an image of the user can be taken with an imager (e.g., a camera) of the mobile device. A database (such as driver license database) can be used to authenticate the user via a biometric authentication using facial recognition. Once the user is authenticated, the database can further be used to look up if the device is authorized for the user. In another example, if the mobile device 102 has a fingerprint biometric sensor, a backend server may be used to perform a biometric authentication to identify the user. The user identity can then be used to lookup valid devices for that user. Additionally, the picture of the user can be associated with the information and stored in the device. The picture can then be used for visual user authentication, such as building access at a company.

At step 316, the enrollment server obtains data required for provisioning the mobile device and sends provisioning instructions including provisioning information to the mobile device 102. The mobile device 102 may send an initial request (mobile device request) to the user authentication server 116 after confirming the validity of the account and mobile device to provision the mobile device (depicted in the process flow 400 at indicator (j.)) and receive an acknowledgement from the user authentication server 116 of the request (depicted in the process flow 400 at indicator (k.)). The user authentication server 116 may then send a subsequent request (provisioning request) to the enrollment server 114 in response to the initial request (depicted in the process flow 400 at indicator (l.)). The enrollment server 114 may then send a provisioning instruction/communication including provisioning information to the mobile device (depicted in the process flow 400 at indicator (m)).

At step 318, the mobile device is provisioned for accessing accounts. The mobile device 108 may be provisioned by storing access information contained in and/or derived from the provisioning information in the provisioning instruction/communication from the enrollment server 114. The access information may be stored in the secure component 200 of the mobile device 102, e.g., in a SE on a SIM or an UICC, to provision the mobile device. Once provisioned, the mobile device may be configured to emulate the access card—functioning as the access card for accessing accounts, restricted areas, etc.

Figure 5:
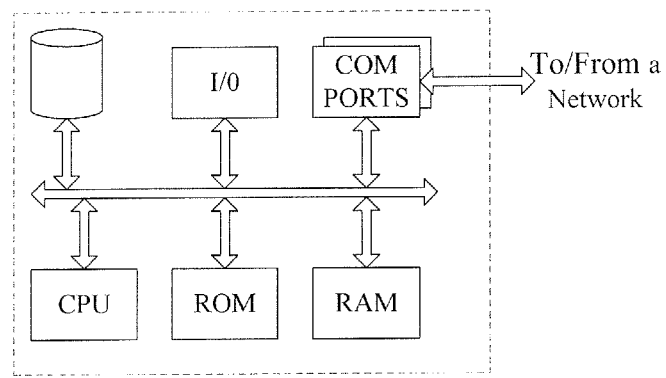
FIG. 5 is a simplified functional block diagram of a computer that may be configured as a server.
Figure 6:
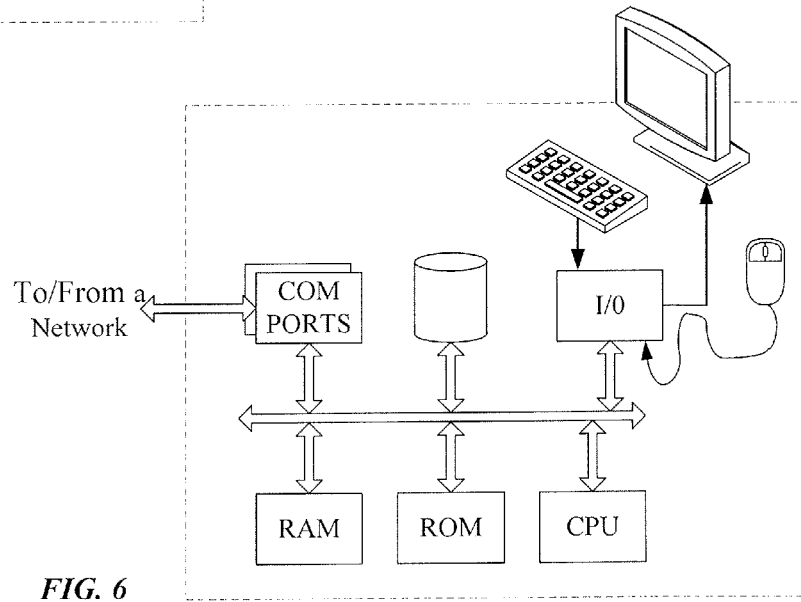
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that the structure, programming and general operation of such computer equipment and as a result the drawings should be self-explanatory.

The software functionalities involve programming, including executable code as well as associated stored data, e.g. executable code and associated data files used for the applications running on the mobile device 102 for the host controller 202 and/or the NFC controller 136b. The software code is executable by the host controller 202 or the NFC controller of the mobile device 102, although as noted, at times, such software may be stored in another computer platform and downloaded through a network for installation in the mobile device 102. Execution of such code by a host controller of the mobile device 102 and/or the NFC controller 136b enables the mobile device 102 to implement the methodology for handling the various NFC communications, conducting the associated action(s) and possibly providing relevant user input/output via user interfaces, in essentially the manner performed in the implementations discussed and illustrated herein. Other executable code and associated data files may be used for the server applications running on one or more computer platforms configured as the remote system 106.

Hence, aspects of the methods of NFC communication, provisioning of a mobile device, and related action processing outlined above may be embodied in programming. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 102, or 211 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method comprising:
obtaining, using an automated data capture device of a mobile device containing a processor, card data for a card associated with an account;
in response to obtaining the card data:
confirming validity of the account by exchanging at least a portion of the card data with a remote user authentication server;
confirming validity of the mobile device by exchanging mobile device information with a remote device authentication server;
sending a request from the mobile device to provision the mobile device after confirming the validity of the account and the mobile device;
receiving provisioning instructions to provision the mobile device in response to the request, wherein the provisioning instructions include provisioning information used to derive access information for the account; and
provisioning the mobile device with the access information for the account associated with the card by storing the access information in a secure component of the mobile device.

2. The method of claim 1, further comprising:
obtaining user authentication data associated with the mobile device;
wherein the request is further based on the obtained user authentication data.

3. The method of claim 2, wherein the user authentication data includes a biometric signature.

4. The method of claim 1, wherein the automated data capture device includes an imager and wherein obtaining the card data comprises:
capturing a visual image of the card using the imager; and
processing the visual image using the processor to obtain the card data.

5. The method of claim 1, wherein the automated data capture device includes a near field communication (NFC) module and wherein obtaining the card data comprises:
capturing a wireless data signal from the card using the NFC module; and
processing the wireless data signal using the processor to obtain the card data.

6. The method of claim 1, further comprising:
determining a current location of the mobile device;
comparing the current location of the mobile device to a geographic limitation to determine compliance with the geographic limitation; and
preventing provisioning of the mobile device if the current location is not in compliance with the geographic limitation.

7. The method of claim 6, wherein the account includes a location access account, the geographic limitation includes an address of a building, and wherein the method further comprises:
determining the current location of the mobile device based on global positioning system (GPS) information, and
comparing the current location of the mobile device to the address of the building to determine compliance.

8. The method of claim 1, wherein the account is a credit card account and wherein confirming validity of the account comprises:
transmitting, by the mobile device to the remote user authentication server, the portion of the card data for confirmation of validity of the credit card account;
receiving, by the mobile device from the remote user authentication server, an indication of the validity of the credit card account; and
confirming the validity of the credit card account, by the mobile device, based on the received indication of the validity from the remote user authentication server.

9. The method of claim 8, wherein confirming the validity of the mobile device comprises:
transmitting, by the mobile device to the remote device authentication server, the mobile device information;
receiving, by the mobile device from the remote device authentication server, an indication of the validity of the mobile device; and confirming the validity of the mobile device, by the mobile device, based on the received indication of the validity from the remote device authentication server.

10. The method of claim 1, wherein provisioning the mobile device comprises:
provisioning a secure element within a subscriber identity module (SIM) or universal integrated circuit card (UICC) of the mobile device with the access information for the account.

11. A mobile device comprising:
a secure component;
an automated data capture device; and
a processor configured to:
obtain card data for a card associated with an account using the automated data capture device;
confirm validity of the account by exchanging at least a portion of the card data with a remote user authentication server;
confirm validity of the mobile device by exchanging mobile device information with a remote device authentication server;
send a request to provision the mobile device after confirming the validity of the account and the mobile device;
receive, in response to the request, provisioning instructions to provision the mobile device, wherein the provisioning instructions include provisioning information used to derive access information for the account; and
provision the secure component of the mobile device with the access information for the account associated with the card by storing the access information in the secure component of the mobile device.

12. The mobile device of claim 11, wherein the automated data capture device includes an imaging device.

13. The mobile device of claim 11, wherein the automated data capture device includes a near field communication (NFC) module.

14. The mobile device of claim 11, wherein the processor is further configured to obtain user authentication data and wherein the request is further based on the user authentication data.

15. The mobile device of claim 14, further comprising:
a biometric sensor coupled to the processor, the biometric sensor configured to obtain the user authentication data.

16. The mobile device of claim 11, wherein the secure component is a secure element within a subscriber identity module (SIM) or universal integrated circuit card (UICC).

17. A method comprising:
confirming validity, by a server containing a processor, of an account based on card data received from a mobile device that is remote to the server;
confirming validity, by the server, of the mobile device based on mobile device data received from the mobile device;
receiving, by the server and from the mobile device, a mobile device request to provision the mobile device, the mobile device request including user authentication data associated with a user of the mobile device; and
sending, by the server and to an enrollment server, a provisioning request to provision the mobile device with access information for the account, the provisioning request including the card data, the mobile device data, and the user authentication data.

18. The method of claim 17, further comprising:
acknowledging, by the server, receipt of the mobile device request to provision the mobile device with access information for the account.

19. The method of claim 17, wherein confirming the validity of the account is performed by a user authentication server and confirming the validity of the mobile device is performed by a device authentication server.

20. The method of claim 17, further comprising:
receiving, by the enrollment server, the provisioning request to provision the mobile device; and
sending, to the mobile device, provisioning instructions to provision a secure element within a subscriber identity module (SIM) or a universal integrated circuit card (UICC) of the mobile device with the access information for the account.

* * * * *